Patented Aug. 28, 1951

2,566,065

UNITED STATES PATENT OFFICE 2,566,065

PROCESSES FOR PHOTOCHEMICAL CHLORINATION OF HYDROCARBONS

Anthony Loverde and Walter S. Beanblossom, Niagara Falls, N. Y., assignors to the United States of America as represented by the United States Atomic Energy Commission No Drawing. Application July 1, 1944,
Serial No. 543,208

5 Claims. (Cl. 204—163)

Our invention relates more particularly to photochemical chlorination of hydrocarbons of the alkyl-substituted single carbon ring type, such as toluene, xylene, mesitylene, cymene, etc., to replace a major proportion of the hydrogen atoms in their chains, e. g., fifty to one hundred per cent.

If the photochemical chlorination of such hydrocarbons is started at room temperature the chlorine at first goes into solution. After a time the reaction starts suddenly. With the start of the reaction the temperature rises sharply and in the presence of so much dissolved chlorine the reaction is liable to become violent and in some cases disruptive, liberating carbon, which darkens the product. For this reason, and because high temperature favors chlorination in the chain, it has been customary to preheat these hydrocarbons to their refluxing temperatures or thereabouts before starting the chlorination. However, these hydrocarbons commonly contain impurities and this is particularly true of xylene, mesitylene, ethylbenzene and cymene. These impurities may include other hydrocarbons, some of which may be unsaturated, or compounds of sulphur. When these hydrocarbons are chlorinated at high temperature these impurities become rapidly chlorinated to products which tend to darken the reaction mixture. This may be due in part to polymerization of unsaturated impurities. Whatever the cause, the darkening of the mixture obstructs penetration of the actinic light, and slows down the reaction. The further chlorination therefore becomes slow and difficult and in some cases completion may be virtually impossible.

We have now found that in the case of each of these hydrocarbons there is a minimum temperature at which the reaction with chlorine under actinic light is spontaneous and proceeds smoothly and another temperature at which the reaction starts with violence, especially if there is much chlorine already in solution, and the product darkens rapidly. Between these two limits there is a range of temperatures within which the reaction of chlorine with these hydrocarbons under actinic light starts spontaneously and proceeds rapidly and smoothly without being violent, and with little or no darkening of the reaction mixture. During the critical starting period the temperature is kept substantially constant by suitable cooling means or regulating the rate of admission of chlorine. After the chlorination has proceeded to a point at which the product contains a substantial quantity of combined chlorine, which may be five to fifteen per cent, we have found that the chlorine present in the molecule inhibits the darkening effects. The temperature can thereafter be allowed to rise gradually, without danger of darkening. Toward the end of the reaction it may be necessary to supply heat. The reaction can thus be carried to replacement of substantially all the hydrogen in the alkyl groups. The favorable temperature ranges are as follows:

|  | Boiling Point | Favorable Range | | |
|---|---|---|---|---|
|  |  | Max. | Preferred | Min. |
| Toluene | 110.7 | 110 | 100 | 80 |
| Xylene | 132–143 | 120 | 90 | 70 |
| Mesitylene (1:3:5) | 165 | 90 | 80 | 25 |
| Ethylbenzene | 136 | 80 | 70 | 50 |
| Diethylbenzene | 181–185 | 80 | 60 | 40 |
| Cymene | 174–182 | 80 | 60 | 25 |

In the above table, where a range of boiling points is given it is because the hydrocarbon has several isomeric forms; also, the boiling points given are not necessarily those of the textbooks, but are the actual boiling points of commercially available products, of which some, such as toluene, are of high purity and others less pure. The purer the hydrocarbon the closer the initial temperature of reaction may approach the boiling point of the hydrocarbons. For this reason, chlorination of toluene can be initiated at almost its refluxing temperature, while chlorination of some of the other hydrocarbons cannot be initiated at temperatures less than 100° C. below their boiling points. Thus, chlorination of high grade xylene can be initiated at 120° C, while chlorination of ordinary commercial xylene cannot be initiated at above 90° C. without darkening the product and retarding further chlorination.

Example I

Two hundred and fifty grams of commercial mesitylene were placed in a flask and chlorination started at room temperature. The temperature rose rapidly to 92° C., whereupon the reaction became disruptive and the product darkened so that further chlorination became difficult.

Example II

Another 250 grams of the same mesitylene as that used in Example I were placed in the same flask and chlorination started at room temperature as before, but the temperature was kept below 90° C. for about eight hours by cooling, after which it was allowed to rise slowly to 120° C. After about 24 hours the product had a melting point of 98° C. and contained 73.9 per cent of combined chlorine, corresponding substantially to nonachlor mesitylene.

*Example III*

Two thousand pounds of commercial xylene were charged into a 500-gallon jacketed enamelled reactor equipped with thermometer and light wells and a reflux condenser. The charge was preheated to 90° C. Chlorine was admitted and the reaction started immediately, the temperature being maintained constant by circulating water through the jacket. After twelve hours the gravity had reached 1.000, corresponding to an average chlorine absorption of about 50 lbs. per hour. From that point the temperature was caused to rise by 20° to 30° C. per day by cooling less and less or, after about 72 hours, supplying steam to the jacket. After 100 hours the temperature had reached 170° C. and the chlorine content slightly above 67 per cent, corresponding nearly to xylene hexachloride.

*Example IV*

One thousand five hundred and ninety-two pounds of a mixture of meta and para xylene were chlorinated for 24 hours at 100 to 120° C., after which the temperature was allowed to rise by 10° to 20° C. per day. After 5½ days the product weighed 4.755 lbs. and contained 69 per cent chlorine or slightly more than corresponding to hexachlor xylene.

*Example V*

Two hundred and fifty grams of para cymene were placed in a flask and chlorination started at room temperature, the temperature being kept below 90° C. for several hours by cooling, after which it was allowed to rise slowly to 120° C. The product had a melting point of 93° C. and contained 73.5 per cent of combined chlorine.

*Example VI*

An effort was made to duplicate the results of Example V, but the product darkened and would not go above 69.1 per cent chlorine, showing that 92° C. is too near the critical temperature to be practicable. Other chlorinations at 60° to 70° C. were entirely successful.

Although the present invention has been described with reference to preferred embodiments and examples, it will be understood that variations and modifications may be made therein without departing from the spirit of the invention; also that it is applicable to alkyl substituted mononuclear aryl hydrocarbons other than those specifically mentioned.

We claim as our invention:

1. The process for the aliphatic chlorination of an alkyl substituted mononuclear aryl hydrocarbon which comprises reacting elemental chlorine with the said hydrocarbon under actinic light for at least several hours while maintaining an initial reaction temperature between about 25 and about 120° C. but below the temperature at which substantial decomposition of the said hydrocarbon occurs, followed by further chlorination of the resultant partially chlorinated hydrocarbon with elemental chlorine under actinic light while gradually increasing to and maintaining a temperature of a maximum of about 170° C. until at least 50% of the hydrogen in the chain of the molecule has been chlorine-substituted.

2. The process for the chlorination of commercial xylene to replace a major proportion of the hydrogen in its methyl groups with chlorine which comprises pre-heating said xylene to a temperature between about 70 and about 120° C., reacting the same with elemental chlorine under actinic light while maintaining the temperature within the said range for at least several hours and continuing to react the partially chlorinated xylene with elemental chlorine under actinic light while increasing the temperature gradually within one hundred hours to 170° C. whereby xylene hexachloride is obtained.

3. The process for the aliphatic chlorination of xylene which comprises reacting elemental chlorine with xylene under actinic light at a temperature of 90° for about twelve hours and continuing to react the partially chlorinated xylene with elemental chlorine under actinic light while increasing the temperature gradually within one hundred hours to about 170° C. whereby xylene hexachloride is obtained.

4. The process for the chlorination of mesitylene which comprises reacting elemental chlorine with mesitylene under actinic light while maintaining the temperature between about 25 and about 90° C. for about eight hours and continuing to react the partially chlorinated mesitylene with elemental chlorine under actinic light while increasing and maintaining the temperature gradually to about 120° C. for about another sixteen hours when nonochlor mesitylene is obtained.

5. The process for the chlorination of cymene which comprises reacting elemental chlorine with cymene at a temperature between about 25 and about 90° C. for several hours and continuing to react the partially chlorinated cymene with elemental chlorine under actinic light while increasing the temperature gradually to about 120° C. whereby a product having a melting point of 93° C. and 73.5% of combined chlorine is obtained.

ANTHONY LOVERDE.
WALTER S. BEANBLOSSOM.

REFERENCES CITED

The following references are of record in the file of this patent:

UNITED STATES PATENTS

| Number | Name | Date |
|---|---|---|
| 1,219,166 | Schmidlin | Mar. 13, 1917 |
| 1,420,346 | Snelling | June 20, 1922 |
| 2,132,361 | Osswald et al. | Oct. 4, 1938 |